United States Patent [19]

Frey

[11] 3,771,865
[45] Nov. 13, 1973

[54] ENDLESS FLEXIBLE SLIDE HOLDER AND METHOD OF MAKING SAME

[76] Inventor: Gerald J. Frey, 1486 Cantera Avenue, Santa Barbara, Calif. 93110

[22] Filed: Dec. 10, 1971

[21] Appl. No.: 206,761

Related U.S. Application Data

[63] Continuation-in-part of Ser. No. 865,613, Oct. 13, 1969, Pat. No. 3,632,200.

[52] U.S. Cl. .............................................. 353/109
[51] Int. Cl. ........................................... G03b 23/12
[58] Field of Search ...................... 353/109, 125 C; 40/32, 35, 96; 58/50, 6 A

[56] References Cited
UNITED STATES PATENTS

| 3,170,369 | 2/1965 | Frey | 353/106 |
|---|---|---|---|
| 2,521,348 | 9/1950 | Davis | 353/109 |
| 335,187 | 2/1886 | Gingras | 24/38 |
| 2,733,181 | 1/1956 | Riedesel | 24/38 |
| 2,441,460 | 5/1948 | Walters | 24/38 |

Primary Examiner—Louis R. Prince
Assistant Examiner—A. J. Mirabito
Attorney—Thomas M. Small et al.

[57] ABSTRACT

A slide holder comprising a fabric belt with parallel bias-cut end edges fitted together to shape the belt into annular form, and a series of spring clips arranged around the belt and adhesively secured thereto with several of the clips straddling the bias-cut end edges to hold the belt in annular form. Also, the method of making the slide holder by bias-cutting a strip of fabric pre-coated with thermo-setting adhesive, shaping the strip to annular form, arranging the clips around it, and thermally curing the adhesive.

7 Claims, 3 Drawing Figures

PATENTED NOV 13 1973 3,771,865

ENDLESS FLEXIBLE SLIDE HOLDER AND METHOD OF MAKING SAME

CROSS-REFERENCE TO RELATED APPLICATION

This is a continuation-in-part of copending application Ser. No. 865,613, filed Oct. 13, 1969, now U.S. Pat. No. 3,632,200.

BACKGROUND OF THE INVENTION

This invention relates to means for holding framed photographic transparencies, hereinafter called "slides," in slide projectors, and relates more particulary to a flexible slide holder of the type having a large number of slide-holding clips arranged in an endless series and flexibly joined together.

One such slide holder is shown in U.S. Pat. No. 3,170,369, in which the clips are supported on an endless flexible belt which is housed in an open-ended, removable magazine having two shafts about which the holder may be advanced step by step by turning one of the shafts through selected angular increments. A more recently developed projector uses an unsupported slide holder similar to the one in the aforesaid patent, without need for the bulky and relatively expensive magazine.

In each case, the clips are small spring metal parts of about the same length as the slides to be held, and only of sufficient depth to provide a firm grip on the frames of the slides. Various connecting means for such clips have been proposed, including interlocking fasteners and belts, but none of these have proved to be completely satisfactory, particularly from the standpoint of economical mass-production.

SUMMARY OF THE INVENTION

The present invention resides in a slide holder of the foregoing general character in which the connecting means is a flexible belt formed by an elongated strip of material having bias-cut, parallel end edges that are fitted together to shape the strip into annular form, and in which the clips are secured to the outer side of the belt, for example, by an adhesive, with several of the clips extending across, or straddling, the bias-cut end edges and secured to the strip on opposite sides thereof to hold the belt in the annular form.

Other objects and aspects of the invention will become apparent from the following detailed description, taken in conjunction with the accompanying drawings.

DETAILED DESCRIPTION

Figure 2:
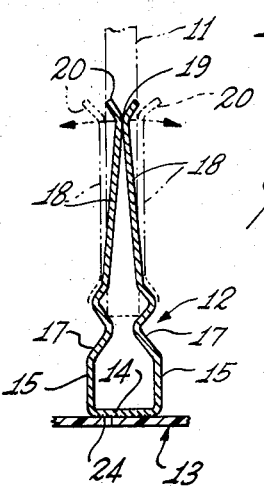
FIG. 2 is an enlarged fragmentary cross-sectional view taken along line 2—2 of FIG. 1 and showing part of a slide and the loaded condition of the clip in broken lines.

As shown in the drawings for purposes of illustration, the invention is embodied in a device 10 for holding a series of framed slides 11 (FIG. 2) while the slides are in a slide projector (not shown), and for advancing the slides one by one into a viewing position in the film gate of the projector as the slide holder is advanced step by step therein, typically by two spaced shafts about which the slide holder is supported. In general, the slide holder comprises a series of spring clips 12 arranged around a flexible belt 13 in an endless annular series, and secured to the belt to travel therewith as the belt is advanced in the projector.

Each illustrative clip 12 herein is a single piece of spring metal, and is shaped to form a flat base 14 (FIG. 2) for lying against the outer side of the belt 13, and two spring fingers which extend away from the base to grip a slide between them. Each such finger extends first outwardly at 15 away from the belt, substantially perpendicular to the base 14, then bends inwardly and back at 17 to form a stop rib in the clip for abutting against the edge of a slide, and then is inclined outwardly and toward the other finger at 18, to form the gripping portion of the finger.

The fingers preferably are pressed together at 19, when free, and may have diverging tips 20 for facilitating insertion of the slides between the fingers. A notch or other cut-away recess (not shown) may be formed in one finger of each clip, in place of or in addition to the diverging tips 20, to assist such insertion.

Figure 1:
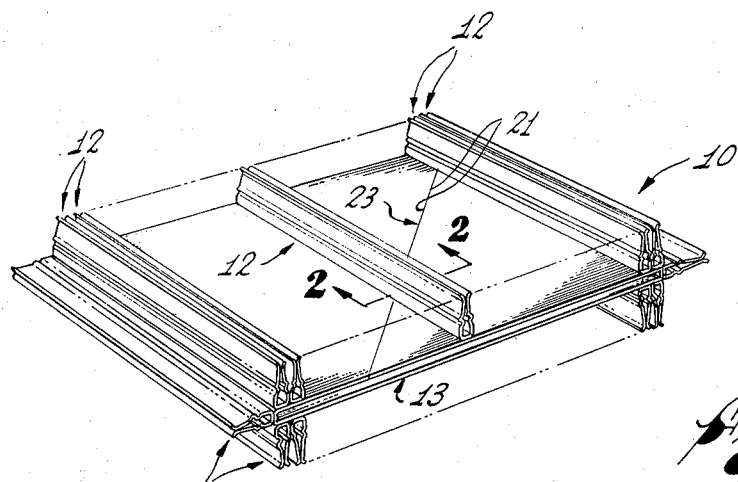
FIG. 1 is a perspective view of a slide holder embodying the novel features of the present invention, but with several clips removed to show the bias-cut end edges of the belt.
Figure 3:
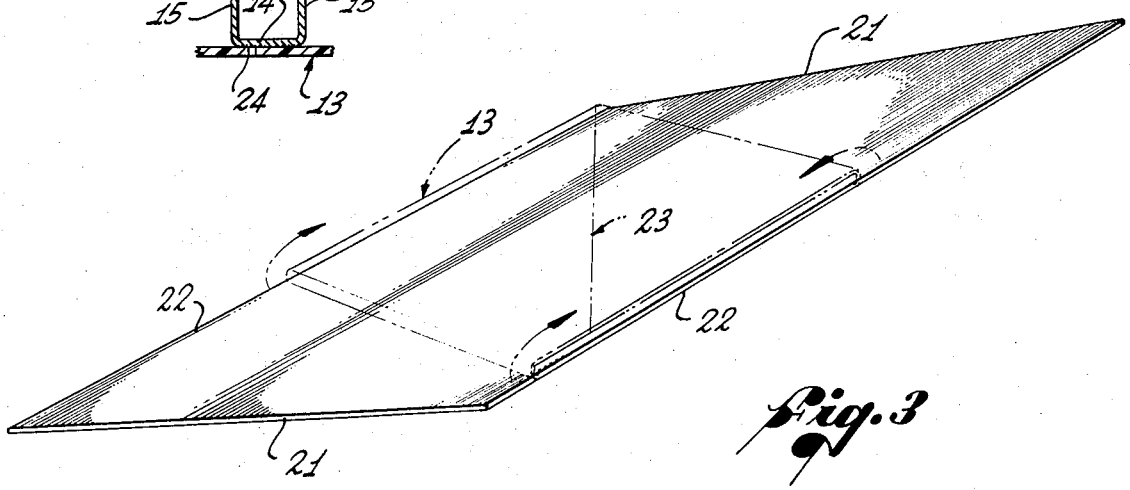
FIG. 3 is a perspective view of the belt of FIG. 1, illustrating the shaping of the belt from a flat strip to the annular form.

In accordance with the present invention, the belt 13 is an elongated strip (see FIG. 3) of fabric or the like having parallel bias-cut end edges 21 intersecting the side edges 22 of the strip at angles other than ninety degrees, and is shaped into annular form by fitting the end edges together in edge-to-edge relation in a loose joint indicated generally at 23 in FIGS. 1 and 3. Then the clips 12 are arranged around the belt with their bases 14 extending transversely across the strip, preferably perpendicular thereto, and with several clips straddling the loose joint 23, and are secured to the outer side of the belt by an adhesive, indicated at 24 in FIG. 2.

In this manner, the clips 12 are securely mounted on the belt 13 and, at the same time, join the bias-cut ends 21 securely together in the annular form. This makes it possible to mass-produce such slide holders in a relatively simple and inexpensive operation.

A preferred material for the belt 13 is a glass cloth or fabric that has been sold by Minnesota Mining and Manufacturing Co., St. Paul, Minnesota, as "Scotch" Brand tape No. Y-9087. This material is pre-coated on one side with a thermo-setting adhesive, permitting the clips 12 to be arranged around a belt in a suitable fixture (not shown) and to be secured to the belt by simply thermally curing the adhesive. The end edges 21 preferable are cut at angles on the order of forty-five degrees with the side edges 22.

The clips 12 should be of about the same length as the slides 11 to be held. The belt 13, in turn, should be of substantially the same width as the length of the clips, although the width may be varied, if desired.

From the foregoing, it will be apparent that the present invention provides an extremely simple, but highly effective, approach to the fabrication and assembly of endless flexible slide holders, and has the advantage of using the clips themselves to join the two end edges of the belt strip securely and permanently together. It also will be evident that, while a preferred embodiment has been illustrated and described, modifications may be made without departing from the spirit and scope of the invention.

I claim:

1. In a holder for slides, the combination of:
a flexible belt comprising a strip of flexible material having parallel bias-cut end edges and parallel side edges, said end edges intersecting said side edges at angles other than ninety degrees, and being fitted together to shape the strip into annular form;
and a series of slide-holding clips arranged around said belt in closely spaced side-by-side relation to extend transversely of said belt, with a plurality of said clips straddling said end edges, said clips having substantially flat bases abutting against the outer side of said belt, and spring fingers projecting outwardly from said bases to receive and hold slides;
and means securing said bases to said belt, whereby said clips are flexibly joined together and supported by said belt in an endless series, and said plurality of clips hold said end edges together to maintain said strip in annular form.

2. The combination defined in claim 1, in which said end edges intersect said side edges at an angle on the order of 45°.

3. The combination defined in claim 1 in which said belt is a fabric having a pre-coat of thermo-setting adhesive on said outer side constituting said securing means.

4. The combination defined in claim 1 in which said clips are perpendicular to said side edges, and said angles are on the order of 45°.

5. The combination defined in claim 1 in which each of said clips is a one-piece spring metal part.

6. The method of forming an endless slide holder having a series of elongated spring clips flexibly joined together, said method comprising the steps of:
cutting a strip of fabric to a preselected length and with the end edges of the strip parallel and disposed at angles of other than ninety degrees with the side edges of the strip;
shaping the strip into annular form and fitting the end edges together in edge-to-edge relation;
arranging the clips in transverse relation around the outer side of the strip with a plurality of the clips straddling said end edges and abutting against said outer side on both sides of said end edges;
and securing said clips to said strip.

7. The method of claim 6 in which said securing step is accomplished by precoating said outer side with thermo-setting adhesive, and then thermally curing said adhesive with said clips in place.

* * * * *